US012334660B2

(12) United States Patent
Moll et al.

(10) Patent No.: US 12,334,660 B2
(45) **Date of Patent: *Jun. 17, 2025**

(54) ELECTRICAL TERMINAL FOR FLAT FLEXIBLE CABLES

(71) Applicant: TE Connectivity Solutions GmbH, Schaffhausen (CH)

(72) Inventors: Hurley Chester Moll, Hershey, PA (US); John Mark Myer, Millersville, PA (US); Forrest Irving Kinsey, Jr., Harrisburg, PA (US)

(73) Assignee: TE Connectivity Solutions GmbH (CH)

( * ) Notice: Subject to any disclaimer, the term of this patent is extended or adjusted under 35 U.S.C. 154(b) by 22 days.

This patent is subject to a terminal disclaimer.

(21) Appl. No.: 18/151,774

(22) Filed: Jan. 9, 2023

(65) Prior Publication Data

US 2023/0163495 A1 May 25, 2023

Related U.S. Application Data

(63) Continuation of application No. 16/919,981, filed on Jul. 2, 2020, now Pat. No. 11,600,937.

(51) Int. Cl.
*H01R 12/69* (2011.01)
*H01R 12/81* (2011.01)

(52) U.S. Cl.
CPC ............. *H01R 12/69* (2013.01); *H01R 12/81* (2013.01)

(58) Field of Classification Search
None
See application file for complete search history.

(56) References Cited

U.S. PATENT DOCUMENTS

| | | | | |
|---|---|---|---|---|
| 3,395,381 | A | 7/1968 | Huffnagle | |
| 3,697,925 | A | 10/1972 | Henschen | |
| 4,160,573 | A * | 7/1979 | Weisenburger | H01R 4/10 439/400 |
| 6,341,980 | B1 | 1/2002 | Hio et al. | |
| 6,350,145 | B1 | 2/2002 | Chen et al. | |
| 6,746,269 | B1 * | 6/2004 | Casses | H01R 4/2495 439/422 |
| 7,462,062 | B2 | 12/2008 | Kumakura | |
| 9,136,628 | B2 | 9/2015 | Aizawa | |
| 10,085,340 | B2 | 9/2018 | Ito | |
| 10,756,463 | B2 * | 8/2020 | Hiroki | H01R 35/04 |
| 11,296,440 | B2 | 4/2022 | Moll et al. | |
| 11,296,441 | B2 | 4/2022 | Moll et al. | |
| 11,600,937 | B2 * | 3/2023 | Moll | H01R 4/182 |
| 2014/0378011 | A1 | 12/2014 | Aizawa et al. | |

(Continued)

*Primary Examiner* — Felix O Figueroa

(57) ABSTRACT

A cable assembly includes a flat flexible cable having a plurality of conductors embedded within an insulation material. A portion of each of the conductors is exposed a shared opening selectively formed in the insulation material, allowing for a crimping portion of an electrically conductive terminal to engage with the conductor within the opening. The crimping portion of the terminal includes a base defining at least one protrusion extending therefrom, and first and second sidewalls extending from the base. The base and the first and second sidewalls define an opening receiving the conductor therein. In a crimped state of the terminal, the first sidewall is folded into the opening for crimping the conductor within the opening and against the protrusion.

18 Claims, 6 Drawing Sheets

(56) References Cited

U.S. PATENT DOCUMENTS

| | | | |
|---|---|---|---|
| 2022/0006213 | A1 | 1/2022 | Moll et al. |
| 2022/0006214 | A1 | 1/2022 | Moll et al. |
| 2022/0006215 | A1 | 1/2022 | Moll et al. |

* cited by examiner

ELECTRICAL TERMINAL FOR FLAT FLEXIBLE CABLES

CROSS-REFERENCE TO RELATED APPLICATION

This application is a continuation of U.S. patent application Ser. No. 16/919,981, filed on Jul. 2, 2020, the entire disclosure of which is incorporated by reference herein.

FIELD OF THE INVENTION

The present disclosure relates to electrical terminals, and more particularly, to electrical terminals suitable for crimping to conductors of a flat flexible cable.

BACKGROUND

As understood by those skilled in the art, flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to a round wire-based architectures. As a result, FFCs are being considered for many complex and/or high-volume applications, including wiring harnesses, such as those used in automotive manufacturing.

The implementation or integration of FFCs into existing wiring environments is not without significant challenges. In an automotive application, by way of example only, an FFC-based wiring harness would be required to mate with perhaps hundreds of existing components, including sub-harnesses and various electronic devices (e.g., lights, sensors, etc.), each having established, and in some cases standardized, connector or interface types. Accordingly, a critical obstacle preventing the implementation of FFCs into these applications includes the need to develop quick, robust, and low resistance termination techniques which enable an FFC to be connectorized for mating with these existing connections.

A typical FFC may be realized by applying insulation material to either side of a pre-patterned thin foil conductor, and bonding the sides together via an adhesive to enclose the conductor therein. Current FFC terminals include piercing-style crimp terminals, wherein sharpened tines of a terminal are used to pierce the insulation and adhesive material of the FFC in order to attempt to establish a secure electrical connection with the embedded conductor. However, due in part to the fragile nature of the thin foil conductor material, these types of terminals have several drawbacks, including much higher electrical resistances compared to conventional round wire F-crimps, inconsistent electrical connectivity between the conductor and the terminal, and mechanical unreliability over time in harsh environments.

Accordingly, there is a need for improved electrical terminals and accompanying termination techniques for adapting FFCs to these environments.

SUMMARY

According to an embodiment of the present disclosure, a terminal for mating with an exposed conductor of a flat flexible cable is provided. The terminal includes an electrical contact and a crimping portion extending from the electrical contact in a longitudinal direction of the terminal for crimping to the conductor of the flat flexible cable. The crimping portion comprises a base defining at least one protrusion extending therefrom, and first and second sidewalls extending from the base. The base and sidewalls define an opening configured to receive the conductor of the flat flexible cable therein. The first sidewall includes a first section attached to the base and a second section attached to the first section on an end opposite the base. In a crimped state of the terminal, the first section of the first sidewall is folded into the opening for crimping the conductor within the opening and against the protrusion, and the second section of the first sidewall is folded so as to overlap or oppose a side of the first section opposite the conductor.

A cable assembly according to an embodiment of the present disclosure includes a flat flexible cable having a plurality of conductors embedded within an insulation material. A portion of each of the conductors is exposed via openings selectively formed in the insulation material, allowing for a crimping portion of an electrically conductive terminal to engage with the conductor within the opening. The crimping portion of the terminal includes a base defining at least one protrusion extending therefrom, and first and second sidewalls extending from the base. The base and the first and second sidewalls define an opening configured to receive the conductor therein. The first sidewall includes a first section attached to the base and a second section attached to the first section on an end opposite the base. In a crimped state of the terminal, the first section of the first sidewall is folded into the opening for crimping the conductor within the opening and against the protrusion, and the second section of the first sidewall is folded in a direction opposite the first section so as to overlap the first section on a side opposite the conductor.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
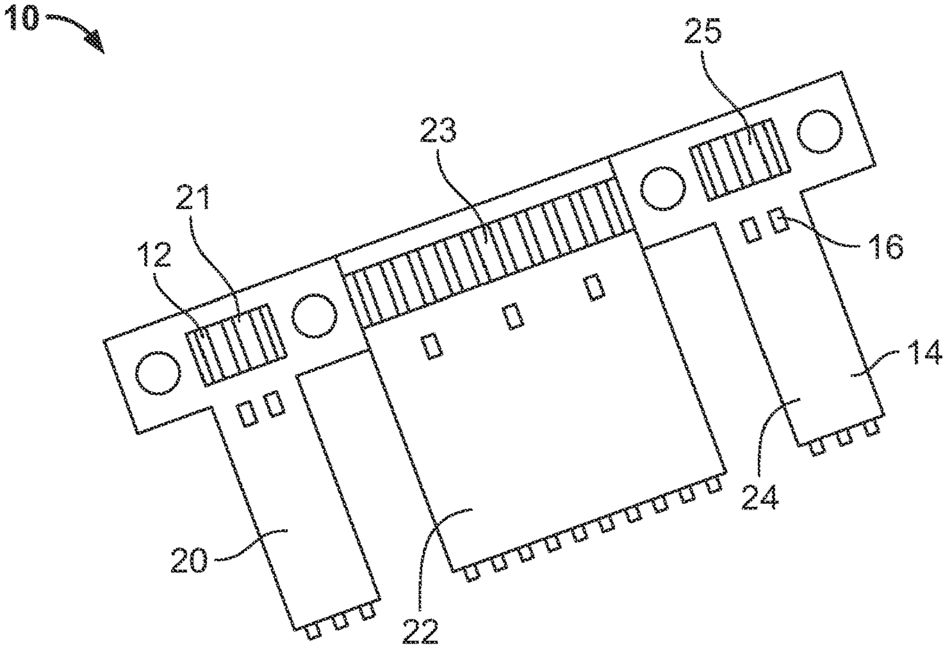
FIG. 1 is a top view of an exemplary FFC configured for use with terminals according to embodiments of the present disclosure.

Exemplary embodiments of the invention will be described hereinafter in detail with reference to the attached drawings, wherein like reference numerals refer to like elements. The invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Reliably crimping a terminal onto a thin conductor of an FFC requires a means to address the risks of either failing to make suitable (or any) electrical contact with the conductor, or damaging the conductor via the application of excess pressure. This has proven difficult to achieve, in part due to the thin nature of the conductors of the FFC compared to the tolerances of typical crimp-style terminals. For example, with a thickness of less than a tenth of a millimeter (mm) (e.g., 0.07 mm), crimping height tolerances can easily exceed the thickness of the conductor, which may result in either a complete lack of electrical contact between the terminal and the conductor, or the crushing and destruction of the conductor, despite a proper crimping operation. As will be set forth in greater detail herein, embodiments of the present disclosure aim to address these difficulties, providing crimpable terminals that enable reliable, low-resistance connections to be realized in mass termination or crimping operations.

Terminals according to embodiments of the present disclosure may be configured for use with an FFC, such as the exemplary portion of an FFC 10 shown in FIG. 1. As illustrated, the FFC 10 generally includes a plurality of conductors 12 embedded within an insulation material 14. The conductors 12 may comprise metallic foil, such as copper foil on the order of 0.07 mm in thickness, by way of example only, patterned in any desirable configuration. The insulation material 14, such as a polymer insulation material, may be applied to either side of the conductors 12 via an adhesive material, resulting in an embedded conductor arrangement. The exemplary FFC 10 includes multiple segments 20,22,24, each containing a plurality of conductors 12. Respective windows or openings 21,23,25 are selectively formed or defined proximate respective ends of the segments 20,22,24 for exposing the conductors 12, enabling connectorization thereof utilizing terminals according to embodiments of the present disclosure. Windows or openings may be formed in the insulation material 14 in any desired location in order to expose portions of the conductors 12 for facilitating termination. Additional openings 16 may be provided, and configured to accept complementary features of associated connectors, as will be described in further detail herein.

Figure 2:
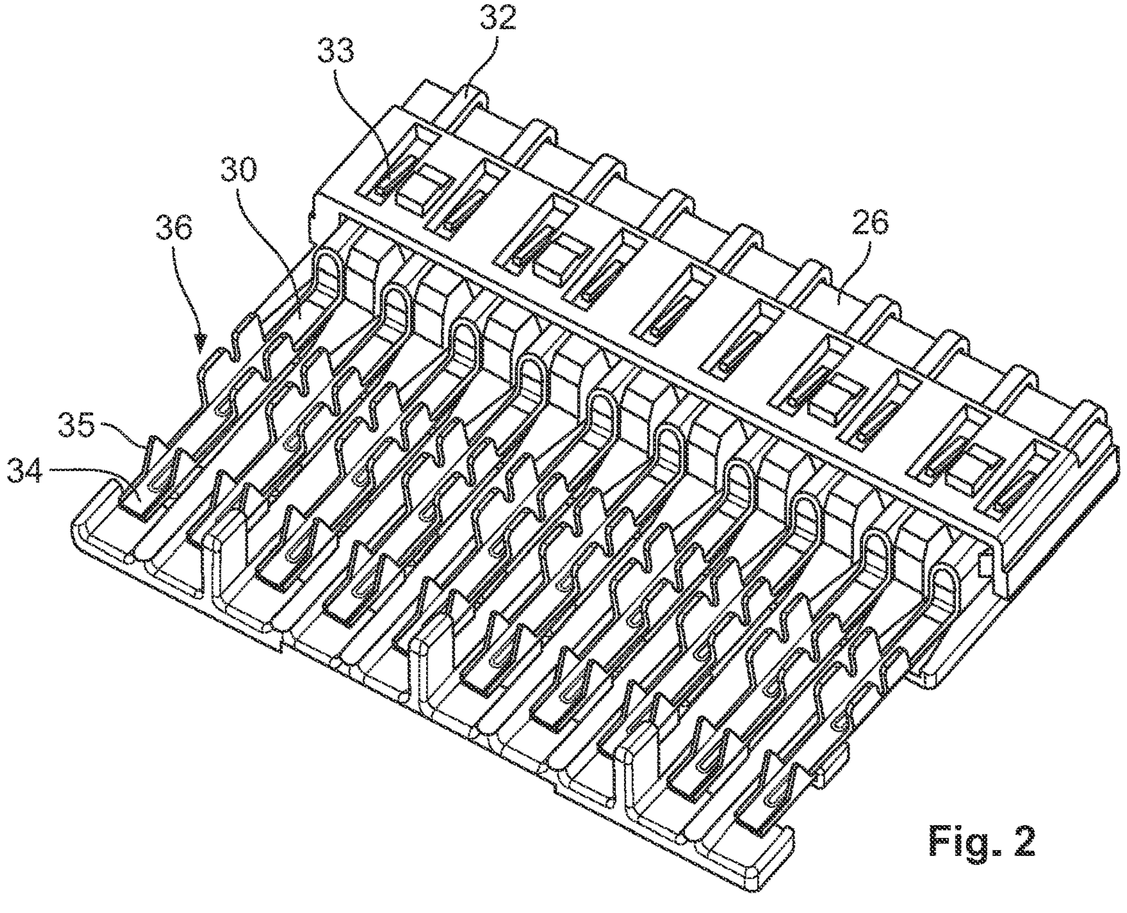
FIG. 2 is a perspective view of a plurality of terminals according to embodiments of the present disclosure installed in an exemplary connector body.

With reference to FIG. 2, an exemplary inner housing 26 forming a part of a connector is provided for fixing to the FFC 10 of FIG. 1, by way of example only. As shown, the inner housing 26 is pre-fitted with a plurality of conductive terminals 30 according to embodiments of the present disclosure. Each terminal 30 generally includes an electrical contact or mating end 32, in this case, a female mating end configured to receive a corresponding male terminal for establishing an electrical connection. The mating end 32 may comprise one or more locking features 33 configured to engage with the inner housing 26 for securing the terminal 30 thereto. A rear end 34 of the terminal 30 opposite the mating end 32 may include piercing elements 35, embodied herein as a pair of sharpened tines. Arranged between the mating end 32 and the rear end 34 is a crimping portion 36 configured to be plastically deformed to crimp onto a conductor arranged therein.

Figure 3:
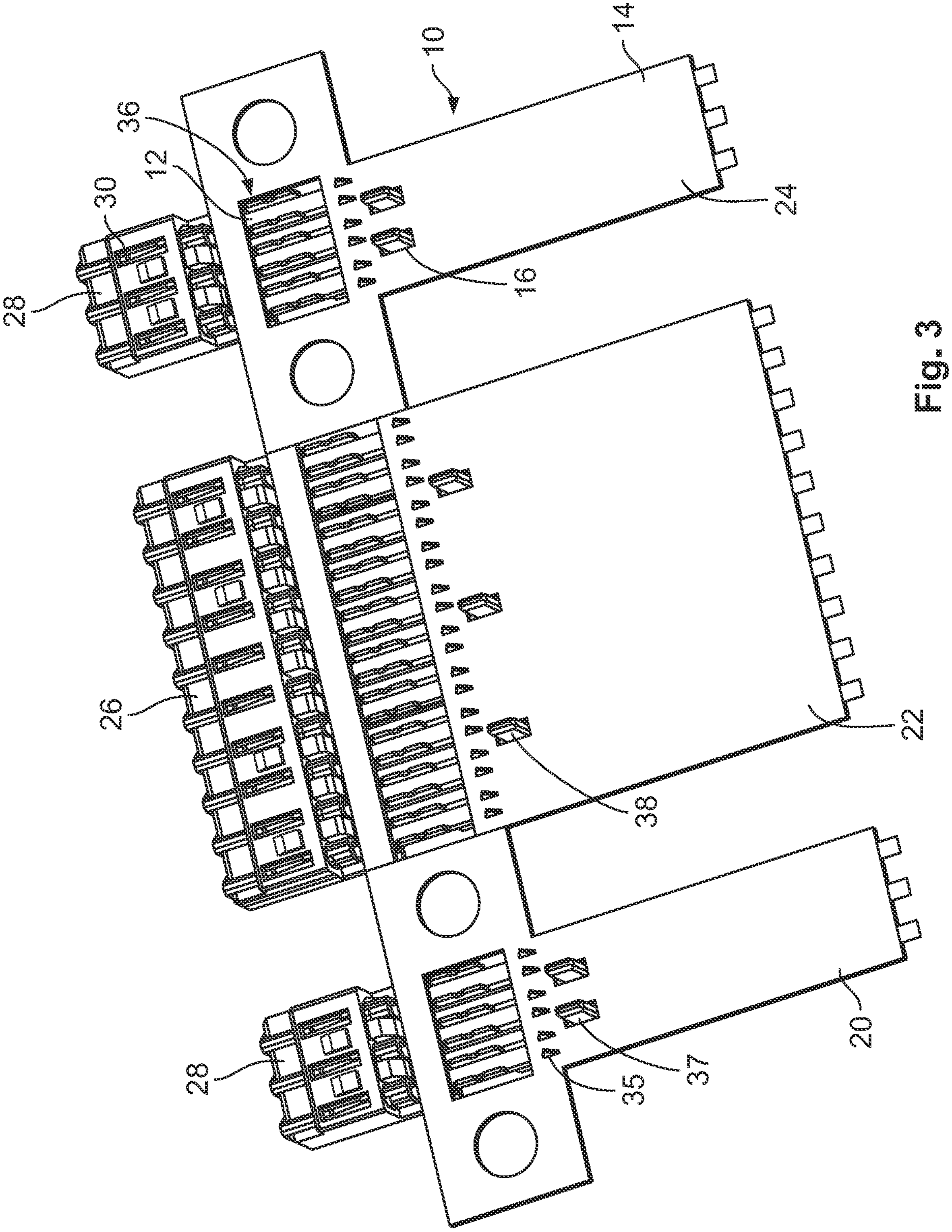
FIG. 3 is a perspective view of the FFC of FIG. 1 being mated with the terminals and connector body of FIG. 2.

FIG. 3 illustrates an intermediate step in a connectorization process of the FFC 10. As shown, the FFC 10 is placed over a plurality of connectors, including inner housing 26 of FIG. 2, as well as two second inner housings 28. The terminals 30 of each of the connectors receive the exposed conductors 12 within respective crimping portions 36 thereof which extend through the windows 21,23,25 (see FIG. 1) formed in the insulation material 14 of the FFC 10. The crimping portions 36 are configured to be crimped onto the conductors 12, for example, in a mass termination or crimping step wherein the crimping portions 36 of each of the terminals 30 is crimped simultaneously, securing the terminals 30, and thus the inner housings 26,28 to the FFC 10. The inner housings 26,28 may further define strain relief portions 37,38 configured to extend through the openings 16 in the FFC 10, which are used to further secure the inner housings 26,28 to the FFC 10. Likewise, as shown, the piercing elements 35 penetrate the insulation material 14 of the FFC 10, and may be flattened or otherwise deformed thereafter for further securing the terminal 30 to the FFC 10. In this way, the piercing elements 35 and the strain relief portions 37,38 provide forms of strain relief for the resulting connection, mechanically fixing the position of the FFC 10 relative to the terminals 30.

Figure 4A:
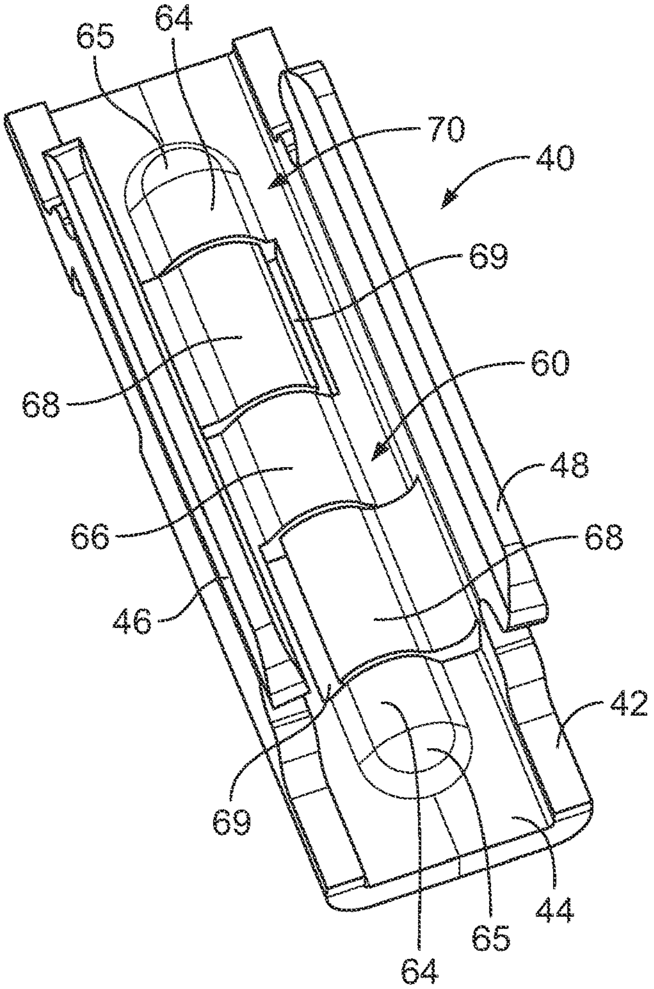
FIG. 4A is a perspective view of a crimping portion of a terminal according to a first embodiment of the present disclosure in an uncrimped state.
Figure 4B:
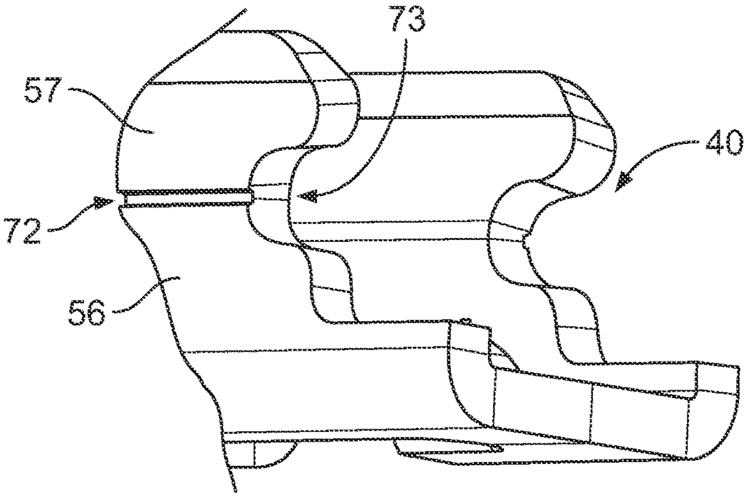
FIG. 4B is a partial perspective view of the crimping portion of FIG. 4A.
Figure 4C:
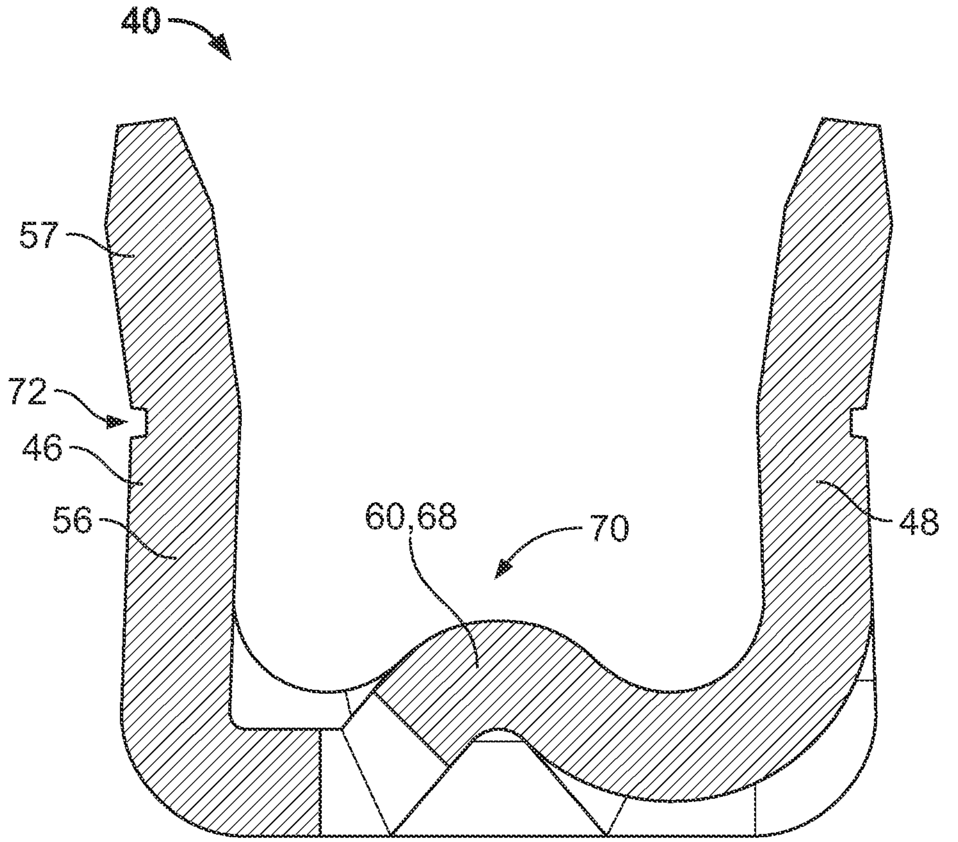
FIG. 4C is a front cross-sectional view of the crimping portion of FIGS. 4A and 4B.

FIGS. 4A-4E illustrate an embodiment of a crimping portion 40 of a terminal (e.g., terminal 30 of FIGS. 2 and 3) configured for use with an FFC according to the present disclosure, with a remainder of the terminal not shown. Referring to FIGS. 4A-4C, in an uncrimped state, the crimping portion 40 comprises a generally U-shaped body 42, including a base 44 and two generally opposing sidewalls or wings 46,48 extending from either side thereof in a direction generally perpendicularly from the base 44. A contact or conductor receiving opening or space 70 is defined between the sidewalls 46,48 and is configured (e.g., sized and shaped) to receive an exposed conductor of an FFC (e.g., conductor 12 shown in FIGS. 1 and 3) therein along an axial direction of the terminal. Each sidewall or wing 46,48 may be defined by two sections, as more clearly illustrated in FIGS. 4B and 4C. Specifically, the first sidewall 46 comprises a first section 56 extending from and adjoining the base 44 at a first end thereof, and a second section 57 extending from an end of the first section. The first and second sections 56,57 may be uniformly continuous with one another, or may be partially divided. For example, a relief or recess 72, which may be embodied as a score line, is formed partially through an intermediate portion of the sidewall 46 in a direction transverse to the longitudinal direction of the terminal, wherein the first and second sections 56,57 reside on respective sides of the recess 72. The recess 72 may extend in a longitudinal direction of the terminal and along a length of the entire sidewall 46. The recess 72 is configured to facilitate bending between each of the first and second sections 56,57 during a crimping operation, so that the second section may be more easily "folded back" over the first section, as illustrated in a crimped state of the terminal shown in FIGS. 4D and 4E. This folding may be further enabled by the formation of a second recess or an undercut 73 formed into each longitudinal end of the first sidewall 46 in an area of the recess or relief 72, such that the recess 72 opens into, or is in communication with, the undercut 73. The undercut 73 extends generally into the sidewall 46 in an axial or longitudinal direction thereof to a predetermined depth, with a portion of the undercut 73 being formed in each of the first and second sidewall sections 56,57.

As shown in FIG. 4C, the first and second sections 56,57 may each extend in a different direction relative to the base 44. More specifically, the first section 56 may extend generally perpendicularly from the base 44, while the second section 57 extends at a non-zero angle from the end of the first section 56 (or a non-normal angle with respect to the base 44), and in a direction generally away from a center of the crimping portion 40. The angled nature of the second section 57 relative to the first second 56 facilitates the crimping or folding of the second section 57 relative to the first section 56 in the desired direction via a force applied in a downward direction onto a top of the second section 57. As illustrated, the second sidewall 48 comprises first and second sections having features similar to those set forth above with respect to the first sidewall 46, such as a corresponding relief and/or undercut defined therein, and will not be described in further detail herein.

Figure 4D:
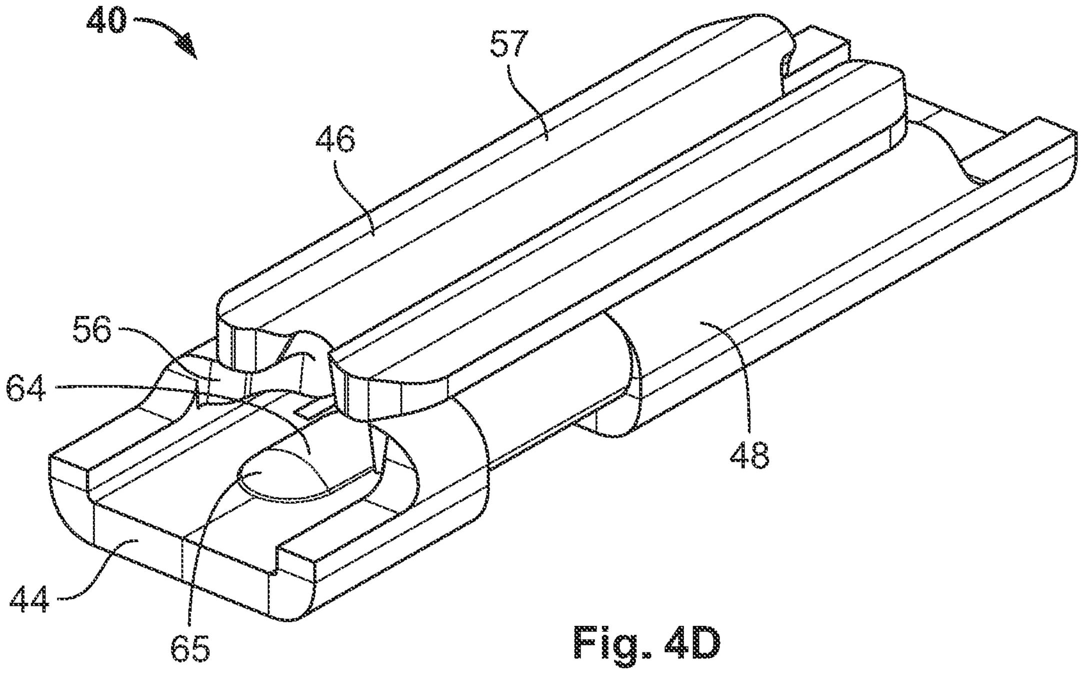
FIG. 4D is a perspective view of the crimping portion of FIGS. 4A-4C in a crimped state.
Figure 4E:
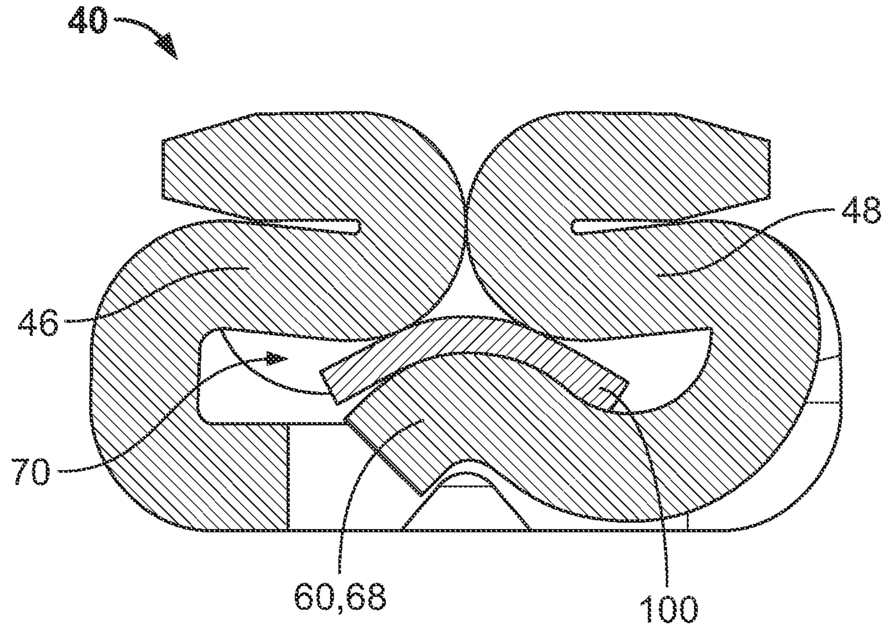
FIG. 4E is a front cross-sectional view of the crimping portion of FIG. 4D.

Referring to FIGS. 4D and 4E, the crimping portion 40 is shown in a crimped state, wherein the opposing sidewalls 46,48 have been crimped or deformed in the described fold back manner from the orientation shown in FIGS. 4A-4C. As illustrated, the first and second sections 56,57 of the first sidewall 46 having been folded or crimped into a generally parallel orientation with respect to the base 44, with the first section 56 folded or rotated in a first direction with respect to the base, and the second section 57 folded in a direction opposite the first direction, such that it overlaps the first section 56 in an opposing or abutting manner. The second sidewall 48 is crimped in a similar, albeit directionally opposite manner, to the first sidewall 46. The sidewalls 46,48 may be folded or crimped simultaneously via application of single downward force on the free ends thereof, allowing for faster termination compared to multi-step crimping processes required for other terminal types. FIG. 4E provides an exemplary cross-sectional view of a crimped state of the crimping portion 40, including a conductor 100 crimped within the receiving space 70 by the sidewalls 46,48.

As set forth above, reliably crimping to a thin, foil conductor of an FFC requires a means to address the risks of either failing to make suitable electrical contact with the conductor, or damaging the conductor via the application of excess pressure. Embodiments of the present disclosure address this problem via the introduction of several additional features onto or into the base 44 of the crimping portion 40 to prevent either of the above failures.

Still referring to the embodiment of FIGS. 4A-4E, the crimping portion 40 includes an axially-extending protrusion or protruding structure 60 rising into the receiving opening 70 from the base 44 and/or from lower ends the first or second sidewalls 46,48. In the illustrated embodiment, the protrusion 60 includes a plurality of segments, including a pair of outer compression limiters 64 defined by raised protrusions extending from the base 44 in a vertical direction into the receiving opening 70. Likewise, a central compression limiter 66 is defined by a protrusion arranged generally between the outer compression limiters 64. In the exemplary embodiment, each of the compression limiters 64,66 comprises an outer curved or rounded profile having an axis of curvature aligned generally parallel with an axial or longitudinal direction of the terminal and/or the conductor to be arranged therein. The outer compression limiters 64 also comprise rounded ends 65 extending in respective axial directions. As shown in FIG. 4D, at least a portion of each of the outer compression limiter 64 extends in an axial direction beyond an end of the first and second sidewalls 46,48, ensuring maximum contact area with a conductor crimped within the terminal.

Due in part to their curved nature, the compression limiters are configured (i.e., are sized and shaped) so as to compress a conductor under force from the crimped first and second sidewalls in a manner which will prevent damage thereto. Moreover, the added height of the compression limiters ensures that reliable electrical contact is always achieved with the conductor, addressing the above-described tolerance-related issues with crimping solutions of the prior art. Further still, the height of the compression limiters may be selected so as to allow for crimp height and compressive force adjustments for a given application (e.g., for different thicknesses of conductors).

Still referring to FIGS. 4A-4E, the protrusion 60 further comprises protruding spring sections or pushers 68 formed between the outer compression limiters 64 and the central compression limiter 66. Each spring section 68 may be arranged at least partially within a corresponding aperture 69 formed through the base 44. The spring sections 68 may each comprise a curved or rounded profile extending into the receiving opening 70 and having an axis of curvature oriented parallel to the axial direction of the terminal. In one embodiment, a radius of curvature of the spring sections 68 generally matches that of the compression limiters 64,66. The spring sections 68 may be taller than the compression limiters 64,66, and thus extend further vertically into the receiving opening or space 70. The spring sections 68 may be embodied as cantilevered springs, each having a free end and a fixed end attached to or extending from a respective sidewall 46,48 (or the base 44), for providing additional elasticity. In other embodiments, the springs sections 68 may comprise uniformly supported leaf springs, with each spring section 68 attached at each end thereof to a respective sidewall 46,48 (or the base 44).

The spring sections 68 and the compression limiters 64,66 create a generally continuous rounded protrusion 60 extending axially within the receiving opening 70. However, nominal gaps or voids may be defined through the base between the spring sections 68 and compression limiters 64,66, allowing for their independent motion or deformation. Further, the edges of each spring section 68 extending transverse to the longitudinal direction of the terminal may improve engagement, and thus electrical contact, with a conductor crimped within the terminal. The spring sections 68 are configured (i.e., sized and shaped) so as to ensure an upward pressure is maintained on a conductor crimped within the terminal, further improving electrical contact with an engaged sidewall of the crimping portion 40.

Figure 5:
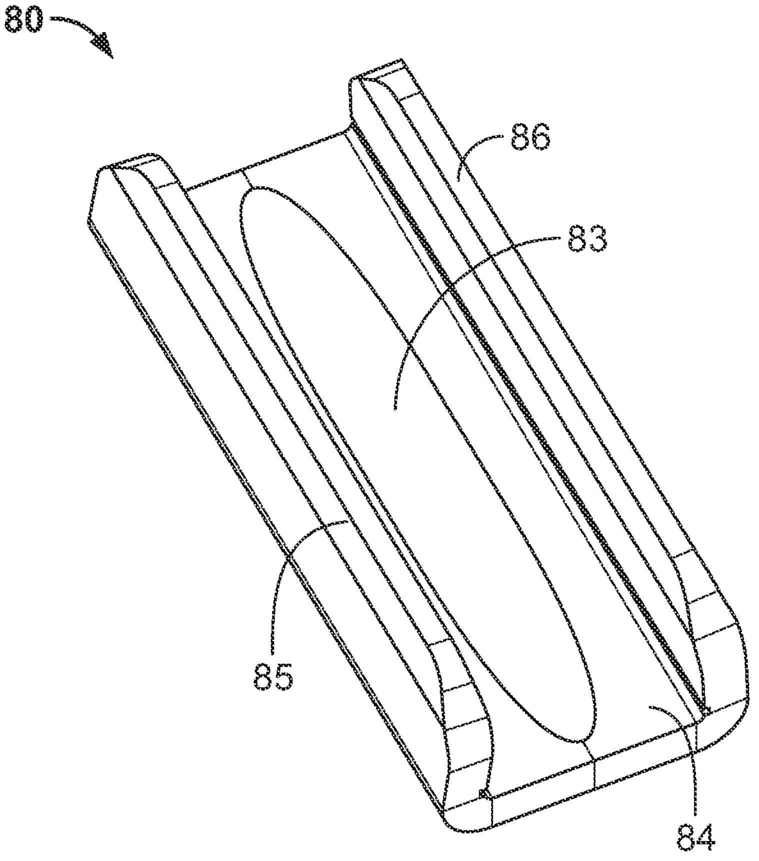
FIG. 5 is a perspective view of a crimping portion of a terminal according to a second embodiment of the present disclosure.
Figure 6A:
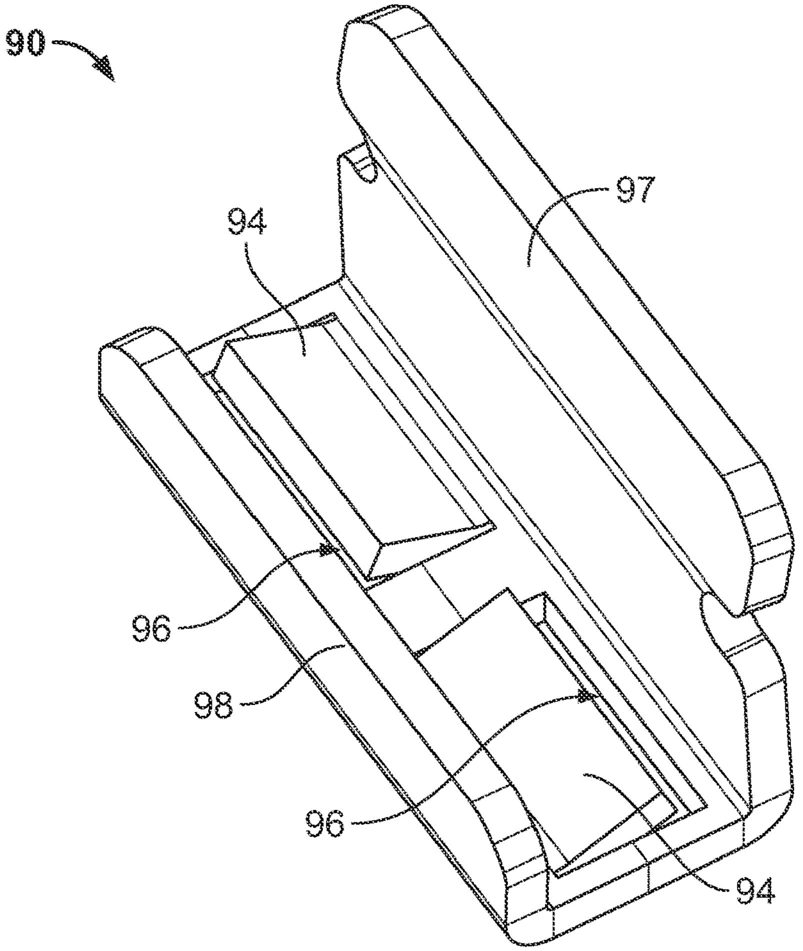
FIG. 6A is a perspective view of a crimping portion of a terminal according to a third embodiment of the present disclosure.
Figure 6B:
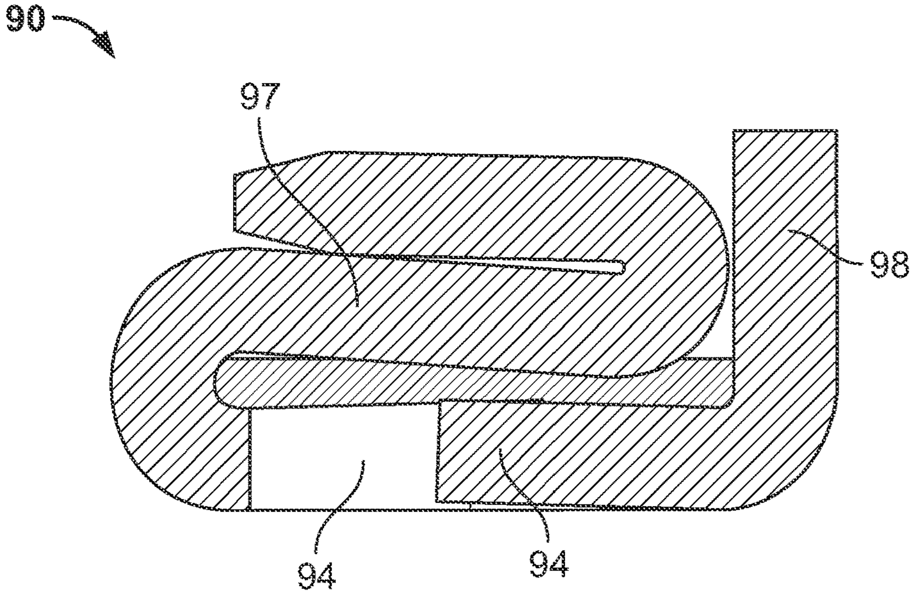
FIG. 6B is a front cross-sectional view the crimping portion of FIG. 6A.

FIGS. 5, 6A and 6B illustrate additional embodiments of the present disclosure. These embodiments may comprise features similar to those set forth above with respect to the embodiment of FIGS. 4A-4D, wherein only relevant distinctions therebetween will be describe herein. For example, the crimping portion 80 according to the embodiment of FIG. 5 includes a compression limiter 83 defining a single elongated protrusion extending in an axial direction of the terminal. The compression limiter 83 may extend along a base 84 substantially over an entire length of the crimping portion 80 or over a length substantially equal to a length of two sidewalls 85,86 configured to be crimped to a conductor arranged within the crimping portion. The compression limiter 83 tapers from a raised center thereof to the base 84 in all directions and defines no planar surfaces. The sidewalls 85,86 of the embodiment of FIG. 5 may comprise features similar to those set forth above with respect to FIGS. 4A-4E.

In the embodiment of a crimping portion 90 shown in FIGS. 6A and 6B, two cantilevered protrusions 94 extend from respective sidewalls and at least partially into respective apertures 96 formed through a base of the crimping portion. Free ends of each protrusion 94 may be bent upwards, or formed linearly upwardly (i.e., project at a non-zero angle relative to the base), so as to extend into the receiving opening of the terminal. In this way, the protrusions 94 function in a similar manner to the above-described compression limiters, as well as the spring portions. Moreover, the three exposed edges of each of the protrusions 94 engage with a conductor in a crimped state for improving the reliability of the electrical connection.

The crimping portion 90 further comprises a first sidewall 97 and a second sidewall 98, wherein the first sidewall comprises a height greater than that of the second sidewall. The first sidewall 97 is configured to be crimped in a fold back manner, similar to the first sidewall 46 of FIGS. 4A-4D, and may include like features (e.g., an undercut and/or a relief formed therein). However, in the embodiment of FIGS. 6A and 6B, the second sidewall 98 is configured to remain in the illustrated vertical position in a crimped state of the terminal, for retaining the illustrated conductor. As shown a first section of the first sidewall 97 comprises a height sufficient extend to the second sidewall 98 in the crimped state, thus engaging a conductor over its entire width.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range. For example, it should also be understood that embodiments of the present disclosure may include any combination of the above-described features, such as various combinations of compression limiters and spring arrangements, and are not limited to the exemplary arrangements set forth in the figures.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A cable assembly including:

a flat flexible cable including a plurality of conductors embedded within an insulation material, at least a top surface and a bottom surface of a portion of each of the conductors are exposed via a common first opening selectively formed in the insulation material, the first opening closed continuously about its perimeter by the insulation material; and a plurality of electrically conductive terminals, each of the terminals having a crimping portion at least partially received through the common first opening in the insulation material and receiving the exposed portion of a respective conductor, the crimping portion including:

a base extending in a longitudinal direction of the terminal and defining a protrusion extending therefrom; and a first sidewall extending from the base, the base and the first sidewall defining an opening receiving the exposed portion of the conductor, in a crimped state of the terminal, the first sidewall is folded into the opening for crimping the conductor within the opening and against the protrusion.

2. The cable assembly of claim 1, wherein the common first opening is pre-formed in the insulation material of the flat flexible cable prior to and independently of the crimping portions of the plurality of terminals receiving the exposed portions of the conductors.

3. The cable assembly of claim 2, wherein the flat flexible cable includes a plurality of second conductors embedded within the insulation material, at least a top surface and a bottom surface of a portion of each of the second conductors are exposed via a common second opening formed in the insulation material.

4. The cable assembly of claim 3, wherein the common second opening is closed continuously about its perimeter by the insulation material.

5. The cable assembly of claim 1, further comprising a plurality of strain relief openings formed through the insulation material, each strain relief opening arranged between an adjacent pair of the embedded conductors outside of the common first opening.

6. The cable assembly of claim 1, wherein the first sidewall includes a first section attached to the base and a second section extending from the first section on an end opposite the base, in the crimped state of the terminal, the first section of the first sidewall is folded into the opening, and the second section of the first sidewall is folded in a direction opposite the first section so as to overlap the first section.

7. The cable assembly of claim 6, wherein the crimping portion further includes a second sidewall extending from the base, the base and first and second sidewalls defining the opening.

8. The cable assembly of claim 7, wherein the second sidewall includes a first section attached to the base and a second section extending from the first section on an end opposite the base, in the crimped state of the terminal, the first section of the second sidewall is folded relative to the base in a first direction and into the opening and the second section of the second sidewall is folded in a direction opposite to the first direction so as to overlap the first section of the second sidewall.

9. The cable assembly of claim 1, wherein the crimping portion further includes a first cantilevered spring extending from the first sidewall or a second sidewall of the crimping portion in a direction transverse to the longitudinal direction of the terminal, the spring having a fixed end attached to the one of the first or second sidewall, and a free end opposite the fixed end extending in the longitudinal direction of the terminal.

10. The cable assembly of claim 1, wherein the crimping portion of each of the terminals further includes a first recess formed in a side of the first sidewall opposite the opening and generally between the first section and the second section, the recess extending along a length of the first sidewall in the longitudinal direction of the terminal.

11. The cable assembly of claim 10, wherein the crimping portion of each of the terminals further includes a second recess formed in an end of the first sidewall and extending into the sidewall in the longitudinal direction of the terminal to a predetermined depth, the first recess opening into and in communication with the second recess.

12. The cable assembly of claim 1, wherein the protrusion comprises:

first and second end sections;

a central section arranged between the first and second end sections;

a first intermediate section arranged between the first end section and the central section; and a second intermediate section arranged between the second end section and the central section, the first and second intermediate sections are moveable independently from the first and second end sections and the central section.

13. The cable assembly of claim 12, wherein the first and second intermediate sections define cantilevered springs, each having a fixed end attached along the longitudinal direction of the terminal to one of the first sidewall or the second sidewall and a free end arranged opposite the fixed end and extending in the longitudinal direction of the terminal.

14. The cable assembly of claim 13, wherein the first and second intermediate sections are separated from the central section along the base in the longitudinal direction.

15. The cable assembly of claim 14, wherein the central section is fixedly attached to the first and second sidewalls.

16. The cable assembly of claim 13, wherein each section of the protrusion defines a curved contact surface having an axis of curvature extending in a longitudinal direction of the terminal.

17. The cable assembly of claim 16, further comprising first and second apertures formed through the base, wherein the first and second intermediate sections extend into a respective one of the first and second apertures from the first or second sidewalls.

18. The cable assembly of claim 1, wherein at least a portion of the protrusion extends beyond each end of the first and second sidewalls in the longitudinal direction of the terminal.

* * * * *